(12) United States Patent
Thibaux et al.

(10) Patent No.: US 7,529,974 B2
(45) Date of Patent: May 5, 2009

(54) GROUPING FAILURES TO INFER COMMON CAUSES

(75) Inventors: Romain Thibaux, San Francisco, CA (US); Emre Kiciman, Seattle, WA (US); David A. Maltz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 329 days.

(21) Appl. No.: 11/565,538

(22) Filed: Nov. 30, 2006

(65) Prior Publication Data

US 2008/0133288 A1 Jun. 5, 2008

(51) Int. Cl.
*G06F 11/00* (2006.01)
(52) U.S. Cl. ........................................... 714/26
(58) Field of Classification Search .............. 714/26, 714/43, 47
See application file for complete search history.

(56) References Cited

U.S. PATENT DOCUMENTS

| | | | |
|---|---|---|---|
| 5,428,619 A * | 6/1995 | Schwartz et al. ............. | 714/712 |
| 6,006,016 A * | 12/1999 | Faigon et al. ................. | 714/48 |
| 6,263,455 B1 * | 7/2001 | Bannister ...................... | 714/25 |
| 6,370,659 B1 | 4/2002 | Maney | |
| 6,651,189 B1 * | 11/2003 | Jeon et al. ..................... | 714/43 |
| 6,704,874 B1 * | 3/2004 | Porras et al. .................. | 726/22 |
| 6,738,933 B2 | 5/2004 | Fraenkel et al. | |
| 6,981,039 B2 | 12/2005 | Cerami et al. | |
| 7,043,661 B2 * | 5/2006 | Valadarsky et al. ............ | 714/4 |
| 7,096,459 B2 | 8/2006 | Keller et al. | |
| 7,103,807 B2 | 9/2006 | Bosa et al. | |
| 7,139,938 B2 * | 11/2006 | Marwaha ....................... | 714/48 |
| 7,159,146 B2 * | 1/2007 | Bowers et al. ................ | 714/37 |
| 2003/0070108 A1 * | 4/2003 | Groen et al. ................... | 714/1 |
| 2003/0149919 A1 | 8/2003 | Greenwald et al. | |
| 2005/0091012 A1 * | 4/2005 | Przytula et al. ................ | 703/2 |
| 2005/0099419 A1 | 5/2005 | Castonguay et al. | |
| 2006/0095232 A1 | 5/2006 | Purdy | |
| 2006/0156073 A1 | 7/2006 | Fachinger et al. | |
| 2006/0224254 A1 * | 10/2006 | Rumi et al. ................... | 700/28 |

(Continued)

OTHER PUBLICATIONS

Chen, et al., "Pinpoint: Problem Determination in Large, Dynamic Internet Services", available at least as early as <<Oct. 18, 2006>>, at <<http://roc.cs.berkeley.edu/papers/roc-pinpoint-ipds.pdf>>, pp. 10.

(Continued)

*Primary Examiner*—Robert Beausoliel
*Assistant Examiner*—Elmira Mehrmanesh
(74) *Attorney, Agent, or Firm*—Lee & Hayes, PLLC (57) ABSTRACT

Systems and methods establish groups among numerous indications of failure in order to infer a cause of failure common to each group. In one implementation, a system computes the groups such that each group has the maximum likelihood of resulting from a common failure. Indications of failure are grouped by probability, even when a group's inferred cause of failure is not directly observable in the system. In one implementation, related matrices provide a system for receiving numerous health indications from each of numerous autonomous systems connected with the Internet. A correlational matrix links input (failure symptoms) and output (known or unknown root causes) through probability-based hypothetical groupings of the failure indications. The matrices are iteratively refined according to self-consistency and parsimony metrics to provide most likely groupings of indicators and most likely causes of failure.

19 Claims, 9 Drawing Sheets

U.S. PATENT DOCUMENTS

2007/0050178 A1* 3/2007 Linzey et al. .................. 703/2

OTHER PUBLICATIONS

Kiciman, et al., "Root Cause Localization in Large Scale Systems", available at least as early as <<Oct. 18, 2006>>, at <<http://research.microsoft.com/~emrek/pubs/rootcause-ws.pdf>>, pp. 06.

Shakeri, et al., "Near-Optimal Sequential Testing Algorithms for Multiple Fault Isolation", retrieved at <<http://ieeexplore.ieee.org/iel5/3184/9020/00400130.pdf?isNumber=>>, IEEE, 1994, pp. 1908-1913.

Sztipanovits, et al., "Diagnosis of Discrete Event Systems Using Ordered Binary Decision Diagrams", retrieved at <<http://www.isis.vanderbilt.edu/publications/archive/Sztipanovi_J_6_0_1996_Safety_Ana.pdf>>, Vanderbilt University, pp. 1-7.

* cited by examiner

GROUPING FAILURES TO INFER COMMON CAUSES

BACKGROUND

In many systems—physical, biological, or informational—when trouble occurs, various symptoms of component fault or failure are periodically observed, yet rarely provide a direct pointer to what lies beneath: the root common cause of the different symptoms. For complex systems, such as the human body, an airliner, an automobile, the Internet, the national power grid, financial systems, etc., the sheer size or detail of the system may provide a daunting challenge to tracing or surmising a "true cause" underlying an assortment of currently occurring symptoms or component failures. Even in a system as commonplace as a desktop computer, even virtuoso troubleshooters can have difficulty bridging the gap between the symptoms of a fault (system misbehaviors and/or cryptic error messages) and the responsible component causing the failure (hard drive, memory, operating system, or software application).

The Internet has become vast and wild in its global reach and its obscure levels of lower-layer plumbing. A significant failure, even on a higher layer of Internet architecture, can be hard to diagnose, that is, to diagnose the true root cause manifested by thousands of symptoms.

In some ways similar to its cousins, the electric power grid and public telephone system, the Internet is not monolithic but consists of numerous autonomous systems, such as Internet Service Providers (ISPs) for example, AT&T and COMCAST. These autonomous systems are connected together with each other and with content providers. If one autonomous system fails, it may affect its own end-users, but may also affect secondary autonomous systems upstream and downstream that depend on it, and subsequent autonomous systems that depend on the secondary autonomous systems, and so on, in a domino effect.

An Internet content provider typically has one or more data centers with many web servers (examples of large content providers include MSN, YAHOO, GOOGLE, etc.). Large and small content providers are typically in business, and expect to receive a certain number of requests for content from different autonomous systems over time. Most content providers may not know and cannot control the many autonomous systems that lie between themselves and their end-users or customers. But when failure affects one of the autonomous systems in the content provider's service chain, the content provider loses money—from lost advertising, lost purchasing, lost dissemination of information, etc.

When a problem is occurring, it takes some sophistication even to be able sense the symptoms of a failure. Conventionally, the courses of action are limited when a problem reaches a human level of awareness. One course of action is to wait until the autonomous system that has the failure fixes itself. The other course of action is to dispatch an engineer to explore each individual failure symptom, many though they be.

Ideally, the choice between multiple courses of action in response to failure symptoms depends on a prioritization of the underlying problem, based on its magnitude, duration, and frequency of recurrence, as well as the expected cost of each course of action. While conventional methods can evaluate the priority of individual failure symptoms, the significance of the underlying problem is manifest only by the combined (e.g., sum) significance of its associated failure symptoms.

What is needed is a way to automatically group together the failure symptoms that occur in complex systems, with little or no a priori knowledge of the system structure, in order to quickly identify high-priority problems, as well as to point up root causes so that when a rash of failures occurs, a root cause of many simultaneous failure symptoms may be quickly located and resolved.

SUMMARY

Systems and methods establish groups among numerous indications of failure in order to infer a cause of failure common to each group. In one implementation, a system computes the groups such that each group has the maximum likelihood of resulting from a common failure. Indications of failure are grouped by probability, even when a group's inferred cause of failure is not directly observable in the system. In one implementation, related matrices provide a system for receiving numerous health indications from each of numerous autonomous systems connected with the Internet. The system groups the failure indications such that each group most likely results from a cause of failure common to the group. A correlational matrix links input (failure symptoms) and output (known or unknown root causes) through probability-based hypothetical groupings of the failure indications. The matrices are iteratively refined according to self-consistency and parsimony metrics to provide most likely groupings of indicators and most likely causes of failure.

This summary is provided to introduce the subject matter of grouping failures to infer common causes, which is further described below in the Detailed Description. This summary is not intended to identify essential features of the claimed subject matter, nor is it intended for use in determining the scope of the claimed subject matter.

DETAILED DESCRIPTION

Overview

This disclosure describes systems and methods for grouping phenomena in order to hypothesize commonalities among the groups formed. The systems and methods discover or hypothesize relationships among numerous data elements representing the phenomena, thereby establishing groups and a common or hidden connection or cause underlying each group. In one implementation, the phenomena consist of health or failure indicators for components of a system. An exemplary system computes the groups such that each group has the maximum likelihood of resulting from a common failure.

The exemplary grouping that infers a root cause of failure does not always mean that the root cause behind a set of symptoms is easily identifiable. An exemplary system recognizes that some sets of symptoms probably have a common cause, e.g., a group may indicate a "syndrome" to which a name can be applied but the nature of which may remain unknown. Further, the common cause or the unidentified (but named) syndrome can be recognized later when it recurs. Thus, the exemplary grouping can help a human to pinpoint the nature of the hypothesized root cause of failure.

Figure 1:
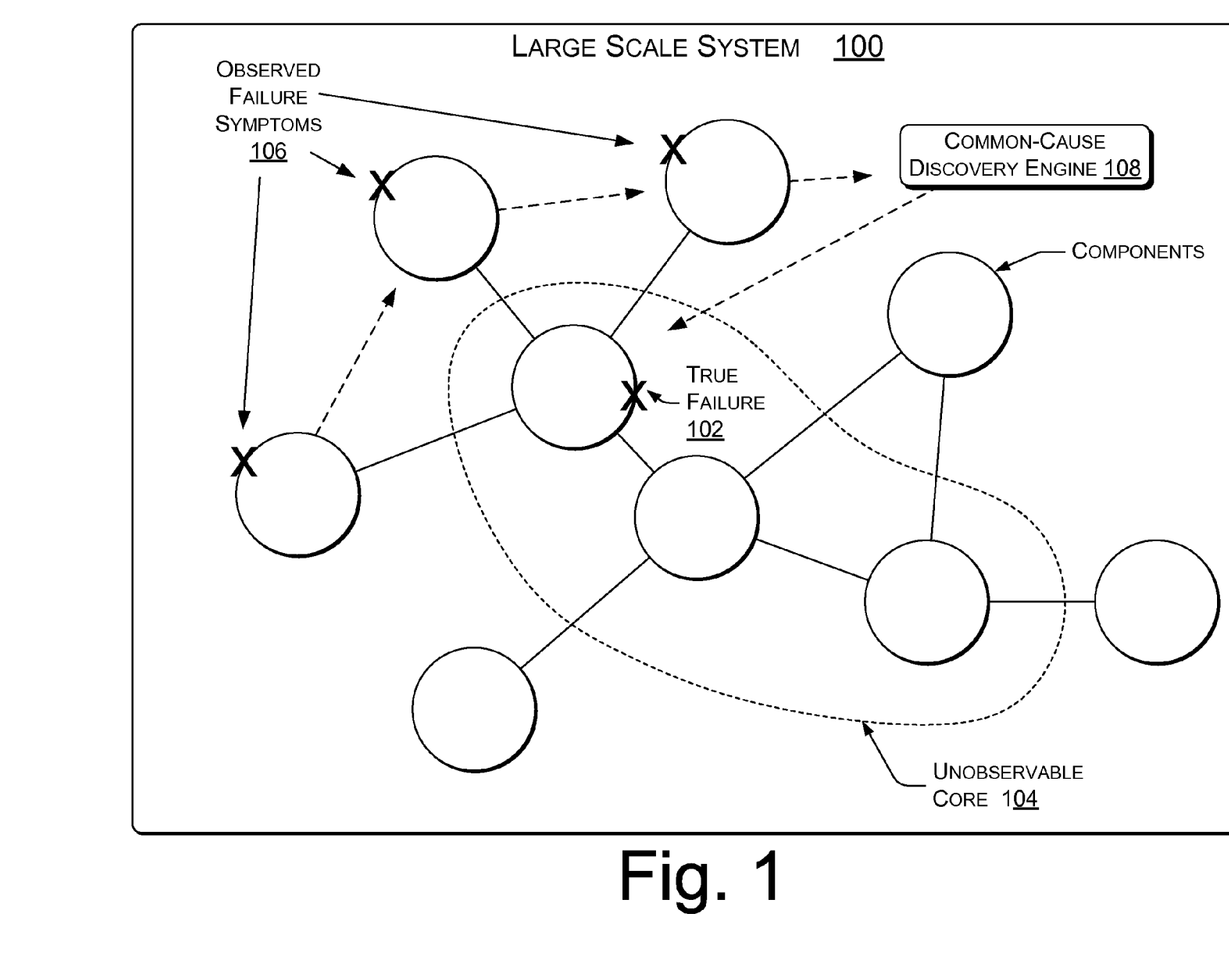
FIG. 1 is a diagram of an exemplary system for grouping indicators to infer a common cause.

As shown in FIG. 1, when a failure occurs in a large-scale system 100, the root cause of the failure, the "true cause" 102, is often not directly observed, because it may lie in an unobservable core 104, or may be unobservable by its nature. Instead, indications of the failure 106 can be observed in many parts of the system as symptoms, seemingly unconnected to each other. Diagnosing the root cause 102 of the failure can be made significantly easier with an exemplary method or exemplary common-cause discovery engine ("discovery engine") 108 described herein for grouping together the disparate failure indications that stem from the same underlying cause 102. In the absence of such an exemplary method or engine 108, each of the failure indications may be investigated individually, wasting valuable human resources. Further, treating each failure indication as a separate event hides relationships among them, while knowledge of these relationships is a significant aid to prioritizing investigations and root-cause diagnosis. The grouping is also important when the location of the true root cause 102 can be directly observed. In this case, grouping failures together can still help avoid duplicating investigative effort. Groups may also expose the fault propagation relationships in the system.

In one implementation, an exemplary system or engine 108 creates a system of matrices—including a first "input" matrix of observed phenomena such as component failures and a final "output" matrix that may either show the phenomena of the first matrix categorized in groups or may show hypothesized root cause events related to the groups. The discovery of relationships between the two matrices (between the input matrix and the output matrix) happens via an intermediate matrix, in which correlations are optimized by probability according to principles of self-consistency and parsimony (here, parsimony means that for a given result, simpler explanations and correlations are ranked higher than more complex explanations and correlations that explain the same result).

As mentioned, exemplary systems and methods have the feature of inferring a common connection or common cause 102 between apparently unrelated phenomena 106, even when the common connection or cause cannot be directly observed. "Implying" and "inferring" are used somewhat loosely and interchangeably herein. Causes of failure are implied or inferred through probability and measures of self-consistency and parsimony in an exemplary system. Further, exemplary systems and methods may infer a common connection or cause that is not only unobservable but is also unknown or as yet undiscovered, that is, the discovery engine 108 may find that a grouping of phenomena have a common cause, without being able to specify the identity or nature of the common cause.

Exemplary systems and methods can be agnostic to the type of system they are monitoring. Because the exemplary discovery engine 108 needs no a priori knowledge of the system that is providing the phenomena and little or no a priori knowledge of the relationships between the phenomena, the exemplary discovery engine 108 can be applied to many different types of systems, can infer relationships between the phenomena while being indifferent to their nature, and can hypothesize a common link between those phenomena, without even knowing what the phenomena are. This indifference to what type of system is providing the data allows an exemplary system or method to be applied to large information systems, such as the Internet, or to automobiles, the human body, atomic and sub-atomic behavior, financial systems, weather systems, etc.

The exemplary discovery engine 108 can discover relationships between failure incidents that occur in extremely large or complex systems (e.g., the Internet, monitoring hundreds or even thousands of components and/or health observations). The exemplary discovery engine 108 infers groups among numerous failure incidents, thereby establishing a likelihood that each particular group of failure incidents has a respective common cause 102. It should be noted that inversely, an exemplary engine could just as easily be directed to discovering common causes of health among many sensor inputs indicating good health of an organism, machine, or system.

Challenges met by the exemplary discovery engine 108 in accurately grouping disparate indications of failures 106 in a large-scale system 100 include the following:

Many failures occur only intermittently and recur over time causing indications of failures to be seen only sporadically;

Indications of failures are often seen in multiple, seemingly disconnected locations in the large-scale system;

In many large-scale systems, the fault propagation paths are unknown, making it difficult to directly group the fault indications together based on the structure of the system;

At any point in time, there are often multiple failures occurring in the system. This means that not all failures indications observed at the same time are necessarily due to the same cause.

Given the above challenges, the exemplary discovery engine 108 provides the following features:

The discovery engine 108 exploits patterns of failure indications occurring over time to build confidence in its classifications;

The discovery engine 108 recognizes that the same set of indications of failures might not be observed each time a specific failure occurs;

The discovery engine 108 does not require an a priori model of the system's fault behavior, such as its fault propagation behavior/paths or the number of different types of failures that might occur;

The discovery engine 108 separates multiple failures that happen to be overlapping in time;

The discovery engine 108 can operate online and scale to analyzing large-scale systems with hundreds or even thousands of components and/or health observations; and The discovery engine 108 operates with a high accuracy and precision.

Exemplary System

Figure 2:
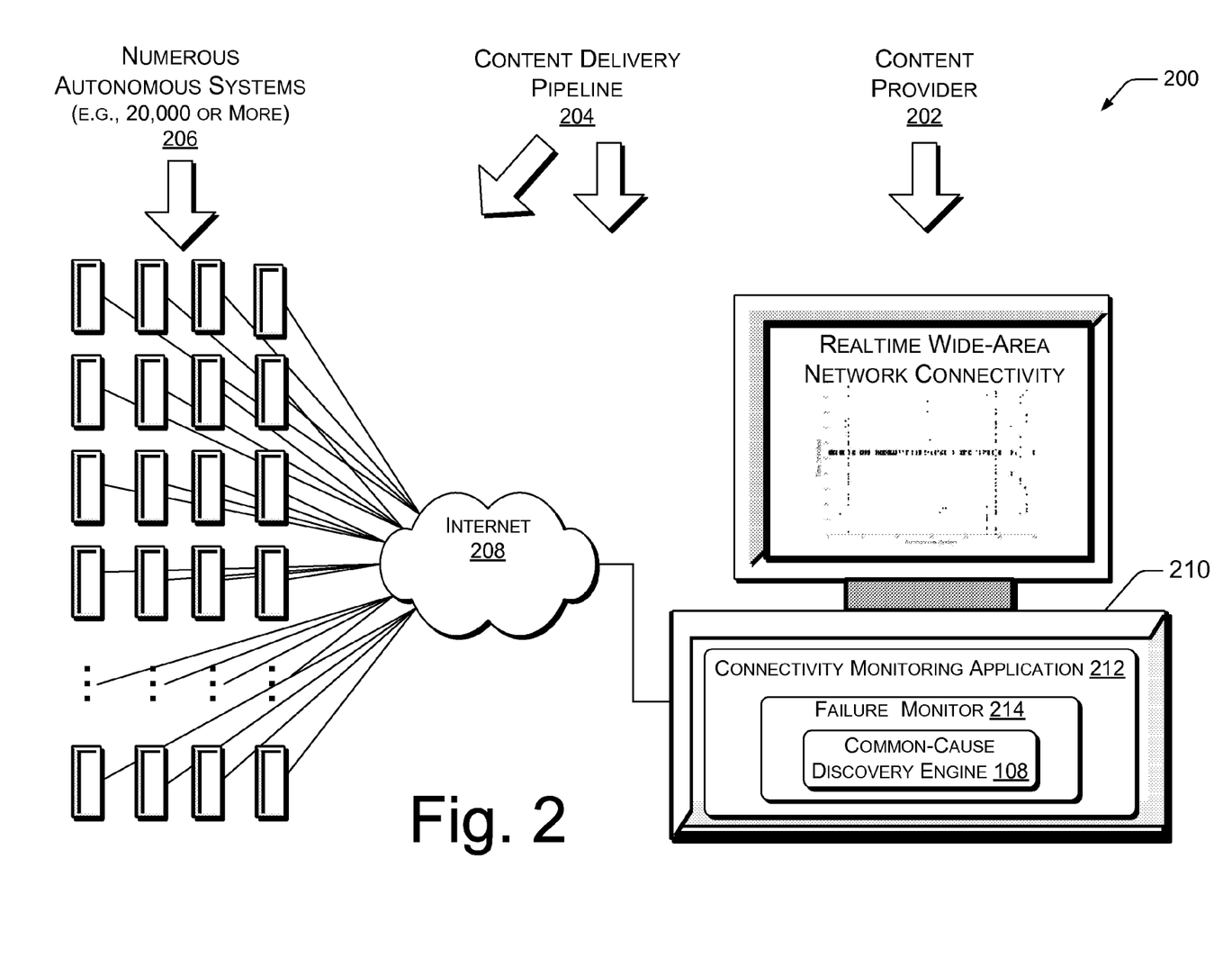
FIG. 2 is a diagram of an exemplary Internet system with an exemplary engine for grouping symptoms to infer a common cause of failure.

FIG. 2 shows an exemplary Internet environment 200 in which the subject matter may be practiced. A content provider 202 disseminates data via a content delivery pipeline 204, that depends on numerous autonomous systems 206 each connected with the Internet 208, including large Internet Service Providers such as AT&T, COMCAST, and many other types of systems of various sizes. It should be kept in mind that although the autonomous systems 206 are shown as connected to the "Internet" 208, their interconnections actually comprise part of the Internet 208, thus they could be shown inside the Internet cloud. A large content provider 202 may depend on approximately 10,000-20,000 such large and small autonomous systems 206 to achieve an end-to-end reach from the content provider 202 to each individual end-user.

Among the data that the content provider 202 would like to monitor is the reliability of the wide-area network connectivity between the content provider 202 and its end-users distributed across the Internet 208. The content provider 202 typically has available to it a time series indicating when the connectivity fails between the content provider 202 and the customers in each of the 10,000-20,000 autonomous systems 206. The connectivity failures represented in these time series are not necessarily due to failures at each autonomous system 206, but rather they are often indications of failures in other network infrastructure, such as transit networks, content distribution networks, and the domain name service infrastructure. Given this information, the content provider 202 desires to automatically determine which failure indications are related to each other, so that only one investigation is started for each set of related failures.

Many content providers 202 dedicate resources, such as a monitoring station 210, to the task of tracking the connectivity status of the content provider 202 with respect to the numerous autonomous systems 206 and the end-users, etc. The monitoring station 210 may provide a readout of real-time system-wide connectivity. Thus, the monitoring station 210 may include a connectivity monitoring application 212 that typically includes a failure monitor 214, i.e., to somehow compile faults and failures of connectivity as they occur across the content provider's distribution pathways. In the illustrated implementation, the failure monitor 214 includes the exemplary discovery engine 108, to process heavy failure data input, hypothesizing relationships among the data and drawing suggestive conclusions regarding common and hidden causes among the data, thus trying to make sense of a large-scale input of diverse and apparently unrelated failure incidents.

Exemplary Engines

Figure 3:
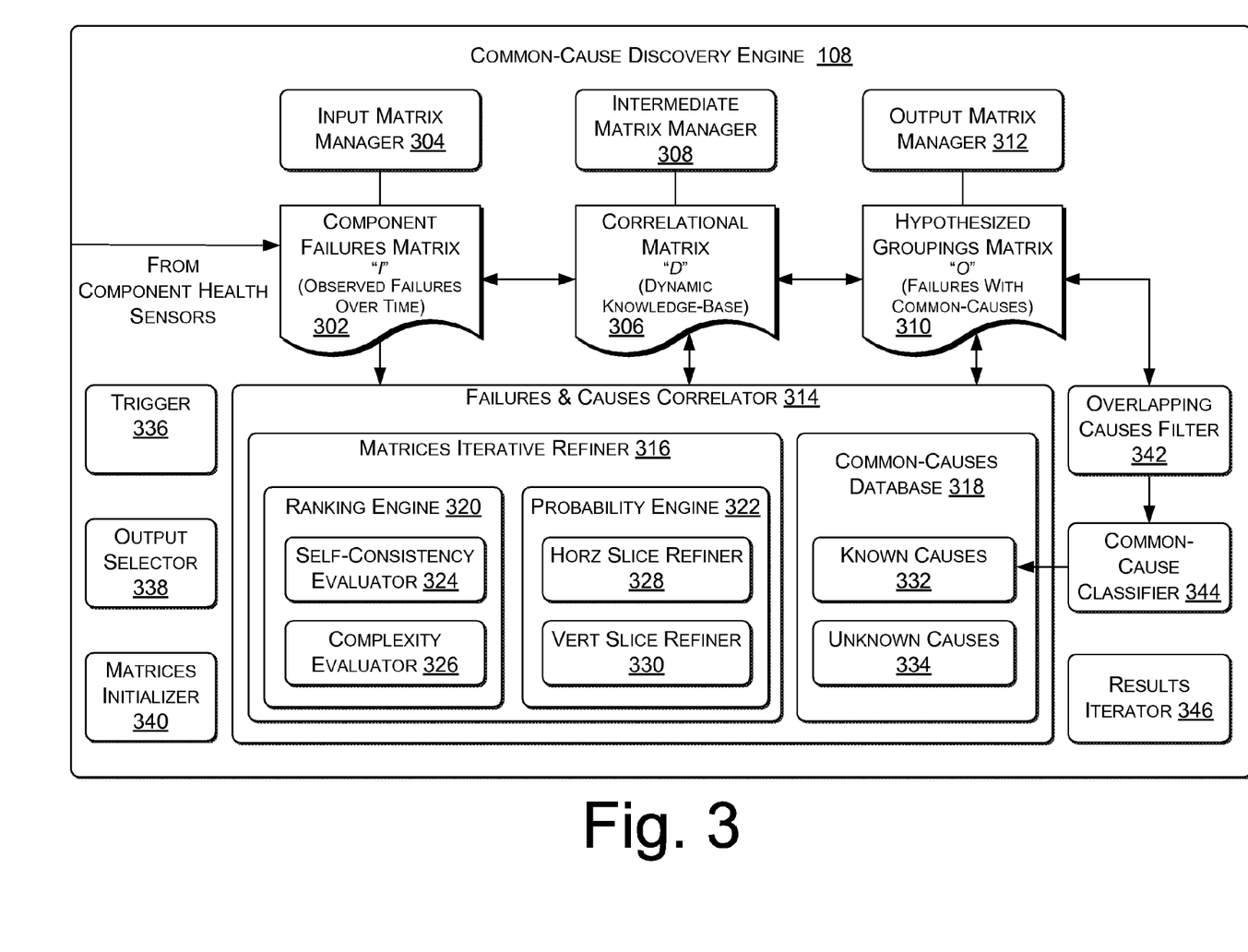
FIG. 3 is a block diagram of the exemplary engine of FIG. 2.

FIG. 3 shows the common-cause discovery engine 108 of FIG. 2 in greater detail. The illustrated implementation is one example configuration, for descriptive purposes. Many other arrangements of the components of an exemplary discovery engine 108 are possible within the scope of the subject matter. Such an exemplary discovery engine 108 can be executed in hardware, software, or combinations of hardware, software, firmware, etc.

In one implementation, the discovery engine 108 creates and manages three matrices: a component failures (input) matrix 302 administered by an input matrix manager 304; a correlational (intermediate) matrix 306 administered by an intermediate matrix manager 308; and a hypothesized groupings (output) matrix 310 administered by an output matrix manager 312. The component failures (i.e., input) matrix 302 may be a time series of component failures across the Internet 208. The hypothesized groupings (i.e., output) matrix 310 may be implied causes of failure, random events, or even known root causes of failure that are at first unassociated with the failure indications that make up the component failures (input) matrix 302. The intermediate matrix 306 can be thought of as a dynamic knowledge base, as it can be time sliced to optimize finding correlation between failure indications and a gallery of possible or implied causes.

The discovery engine 108 includes a failures-and-causes correlator 314 ("causes correlator" 314) that finds a "best" intermediate matrix 306 and output matrix 310 to fit a particular input matrix 302. The causes correlator 314 further includes a matrices iterative refiner 316 and a common-causes database 318. The iterative refiner 316 may further include a ranking engine 320 and a probability engine 322. The ranking engine further includes a self-consistency evaluator 324 and a complexity evaluator 326. The probability engine 322 may further include a horizontal slice refiner 328 and a vertical slice refiner 330. The common-causes database 318 contains both known causes 332 and unknown causes 334.

Other components of the exemplary discovery engine 108 may include a trigger 336 to begin the operation of the discovery engine 108, an output selector 338, and a matrices initializer 340. Still other components may include an overlapping causes filter 342 that sorts out failure indications and common causes that occur contemporaneously, a common-cause classifier 344, and a results iterator 346 that passes the "experience" gained in one session to a subsequent runtimes (the intermediate matrix 306 may be persisted to serve such a purpose).

The exemplary discovery engine 108 can help Internet content providers 202 to improve reliability of their Internet sites as seen by end-users. A significant consideration is whether individual consumers can connect over the Internet 208 to the computers of the content provider 202. The exemplary discovery engine 108 aims to help diagnose causes of connectivity failure when only limited failure data is available to the content provider 202. The content provider 202 may not know the statuses of each of the many autonomous systems 206 between itself and individual consumers. But the content provider 202 often does have various failure "sensors" under its control. For example, the content provider 202 may have ongoing health indicators that show when an expected number of client requests or hits are not being received. The content provider 202 may also run code on a selection of the end-user's machines that uses out-of-band methods to inform the content provider 202 when the end-user cannot connect with the content provider 202. Web logs at strategic points on the delivery pipeline 204 are another type of sensor to detect, debug, and resolve connectivity failures.

Knowledge of failures is an important part of a content provider's business. Conventionally, each connectivity failure is prioritized, and high-priority connectivity failures tend to be assigned a separate technician or web engineer to diagnose and fix the failure. If an underlying problem does not have at least one high-priority connectivity failure then the problem will not be investigated and resolved, regardless of the true significance of the underlying problem. In contrast, if an underlying problem has multiple high-priority connectivity failures then the same underlying problem may be investigated by multiple technicians or engineers, wasting valuable resources. The discovery engine 108, however, can often infer a common cause for groups of the failures, so that output of the discovery engine 108 can be correctly prioritized and passed to one engineer, who can find the root cause of the many failures using reduced resources. Often, if numerous failures can be traced to a common-cause at one autonomous system 206, then the content provider 202 can contact the autonomous system 206 to point out there is a problem and/or offer to help fix the problem. Thus, the discovery engine 108 reduces dimensionality of the maintenance problem.

In one implementation, an exemplary system 200 allots one sensor per autonomous system 206, such that a light is on or a data bit is high when there is a problem, and the light is off or the bit is low when there is no problem with that part of the delivery pipeline 204. The discovery engine 108 has no knowledge of the various fault propagation paths connecting the various sensors, and the content provider 202, as mentioned, may also not have very complete information about the fault propagation paths through multiple layers of Internet architecture. The content provider 202 would not know that a provider in Europe, for example, has an agreement to share a data pipe with another provider in a different geography. In general, the lowest level of network connectivity between everyone in world is not known by anyone, but also, the domain name service hierarchy, overlay networks, and other layers of architecture can cause errors to propagate in ways unknown to content providers 202. Thus, the exemplary discovery engine 108 avoids requiring knowledge of network topology, because often there is insufficient information available to make valid failure-cause correlations based on knowledge of the network structure. For the exemplary discovery engine 108, if there is something in the Internet architecture making failure lights go on at the same time, then the discovery engine 108 discovers that the lights are related, without knowing that they have something to do with same parts of Internet 208.

The desired output of the discovery engine 108 yields the best way of clustering sensor failure indications such that each cluster most likely represents the effects of a root cause in the real system. The exemplary discovery engine 108 eventually provides a record of failures and causes that make it easier to track health of the entire content provider system 200 over time. Knowing how many failing root causes there are and how often each of them fails allows the content provider 202 to decide how to prioritize resources, which to fix first, and which are the most recurring. The discovery engine 108 can also reveal relationships between different components of the system 200 that are not at first apparent to anyone. For example, if two components always fail at the same time, then there is probably a dependence between them, even if the engineers are not yet aware of why.

Exemplary Matrix Structures

Figure 4:
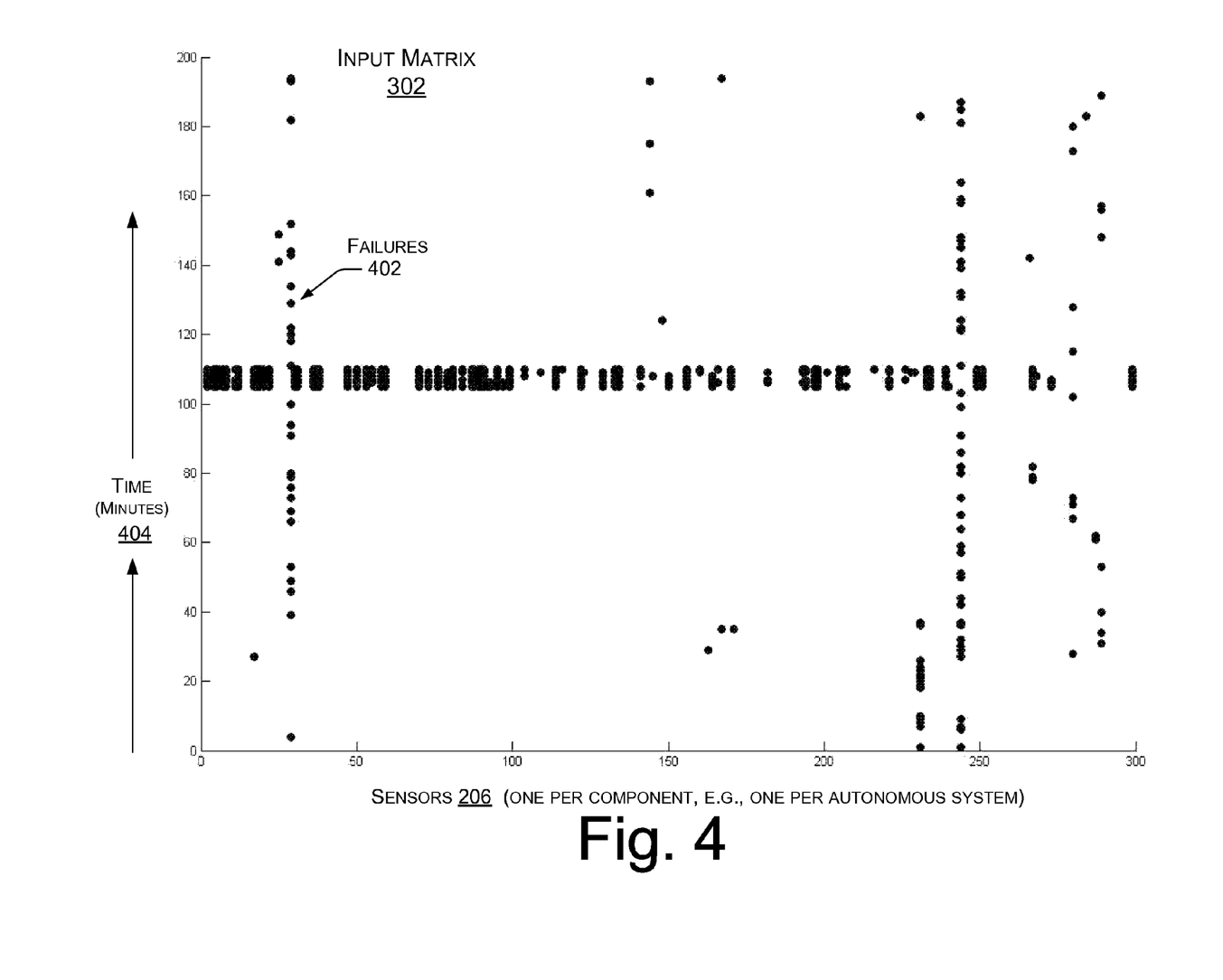
FIG. 4 is a diagram of an exemplary matrix of failure indications.

FIG. 4 shows failure indications typically available to content providers 202, as input data for the input matrix 302. The x-axis represents the sensors, one per component where each component is an autonomous system 206 and the y-axis represents time 404. In one implementation, each data point (e.g., 402) indicates a one-minute time interval during which a given component, in this case a single autonomous system 206, is either in a failure state or in a normal health state, i.e., a binary "on-off" indication. In FIG. 4, only the failure states are shown as black dots. Each point in the tableau represents a one-minute period of failure wherein the given autonomous system 206 experienced significant connectivity problems with the content provider 202.

Figure 5:
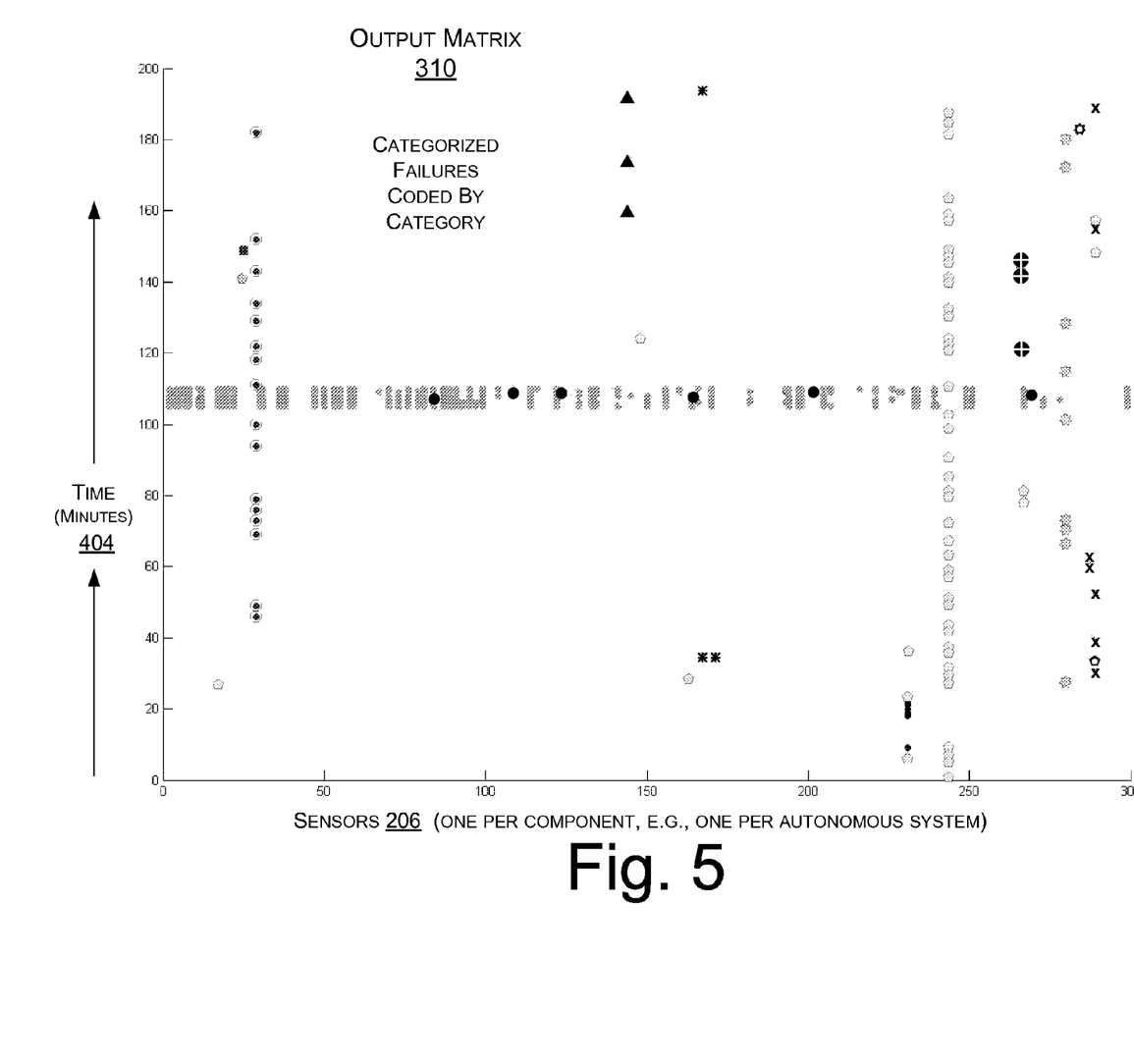
FIG. 5 is a diagram of an exemplary matrix of failure indications grouped to infer common causes.

FIG. 5 correspondingly shows one implementation of an output matrix 310 from the exemplary discovery engine 108 based on the above data of FIG. 4. The axes are the same as above in FIG. 4. In the illustration, different symbols or color coding is used to designate the respective data points of the hypothesized groups. Each failure indication in the tableau of FIG. 5 is labeled with a color or mark that indicates the failure grouping. In this case, hundreds of distinct failure indications are reduced to only a handful of related failure groups, each group implying a respective root common cause of failure.

Figure 6:
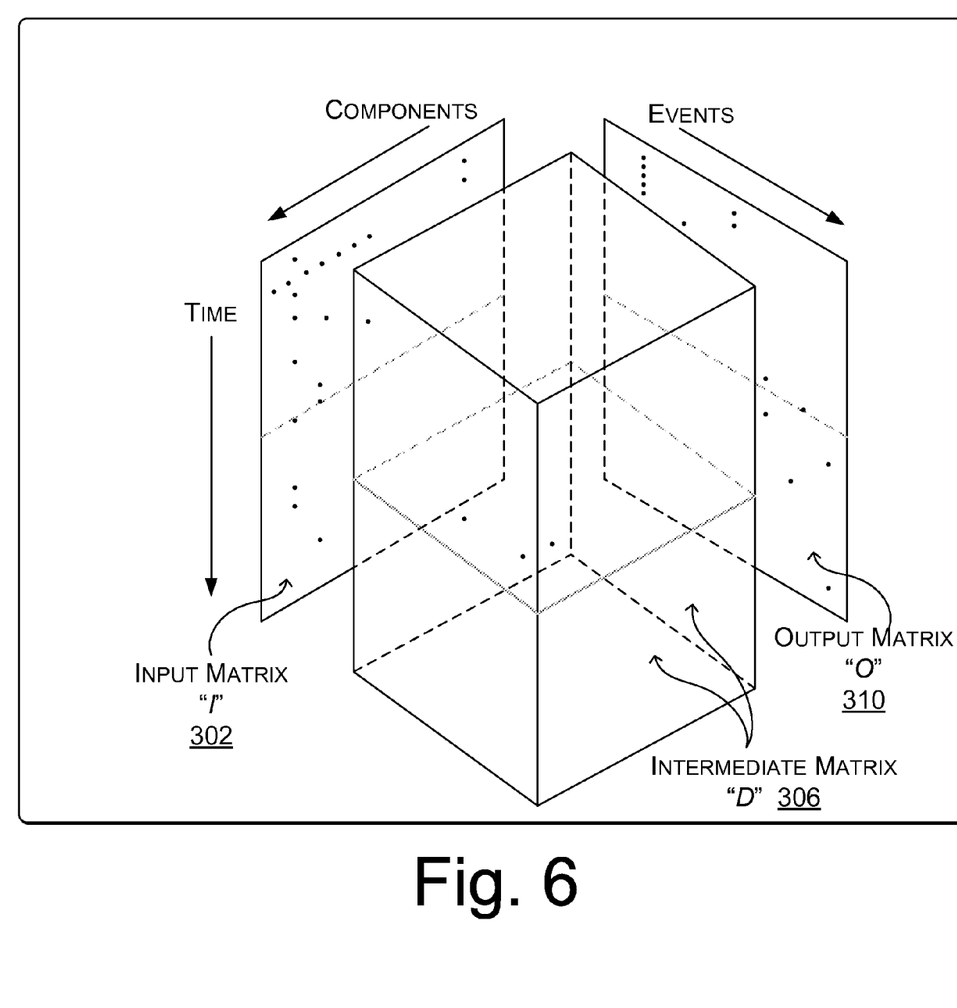
FIG. 6 is a diagram of an exemplary matrix system for correlating failure indications with inferred causes of failure.

FIG. 6 shows a binary implementation of the exemplary intermediate matrix 306. The binary intermediate matrix 306 is used with certain constraints as will be described below to connect the observations of component failures in the input matrix 302 to the hypothesized grouping of failures with common-causes in the output matrix 310. In FIG. 6, the input from the input matrix 302 for a given time can be considered to be projected onto a horizontal slice of the intermediate matrix 306. Likewise, output in the output matrix 310 for a given time can be considered to be projected from (or to) the corresponding horizontal time-slice of the intermediate matrix 306.

Even though the foregoing explanation of the input matrix 302 and the output matrix 310 projecting their data points onto a horizontal slice of the intermediate matrix 306 appears at first glance to be a 1:1 translation or reflection of input to output through an intermediate matrix, the failure indications are correlated to implied causes of failure via probability vectors. Also, the failure indications sensed by the content provider 202 and the implied causes of failure do not necessarily coincide temporally. Therefore, the discovery engine 108 aims to match a given part of the input matrix 302 associated with a particular time with a "best fit" output matrix 310 and intermediate matrix 306 without regard to time. Instead, time-slices of the intermediate matrix 306 are ranked not temporally, but according to probability, self-consistency, and reduction of complexity by the iterative refiner 316.

In the intermediate matrix 306, the time axis 404 represents observations stacked up over time. However, the discovery engine 108 or an exemplary method, is indifferent to the aspect of temporal order. That is, the order of the time-slices does not affect the end output result. So, the discovery engine 108 has no bias against detecting that a problem that occurred yesterday is the same as a problem that occurred today.

In one implementation, a Beta Process is used to select when new events are generated, and Metropolis Hastings sampling rather than Gibbs sampling is used to control how to randomly populate the intermediate matrix 306 based on what the discovery engine 108 determines is happening in the system thus far in the run.

The exemplary discovery engine 108 makes use of probabilities implied by the intermediate binary matrix 306 and the hypothesized groupings of the output matrix 310 as a key metric for ranking possible groupings of failures that have a common-cause without requiring a priori knowledge of system structure.

Operation of the Exemplary Engine

The exemplary discovery engine 108 correlates observations about components with events, such as events that constitute root causes of failure for groups of the observations. A component, then, is a unit of observable health or sickness/failure within a larger system. An observation is a discrete reading of the health/failure status of a component, e.g., within a specific time interval. And in one implementation, an event is a distinct root cause of a failure. An event may or may not be directly observable in the system or correspond to any component of the system.

In one implementation, the input to the exemplary discovery engine 108 is a list of observations, each represented by a tuple given as: <the component being observed, the component's failure status, and the time of the observation>. In the content provider example of FIG. 2, the components are the autonomous systems 206 and the failure status is whether or not there is connectivity problem at the given time.

The output selector 338 either automatically or, guided by user input, can choose one or more of the following outputs:

a set of events representing distinct causes of observed failures;

for each event and each component, the probability that the component fails when that event occurs;

for each point in time, the list of events that are active (i.e. causing observable failures) at that point in time;

for each observed failure, a list of events that are most likely to be the cause of that observed failure.

In FIG. 6, the input matrix manager 304 arranges the input list of observations into the input matrix 302, which in one implementation can be a sparse matrix $I_{c,t}$, where c ranges over the observed components and t ranges over the time period under analysis. In one implementation, one of the outputs, the list of events active at any given time, is also represented as the output matrix 310, i.e., a sparse matrix $O_{e,t}$ where e ranges over the events and t ranges over the time period under analysis. The method calculates the output $O_{e,t}$ from the input $I_{c,t}$ through the creation and refinement of the intermediate matrix 306, such as matrix $D_{c,e,t}$. In one implementation, $D_{c,e,t}$ is a matrix of binary values, where a $D_{c,e,t}$ value of 1 indicates that component c is failing because of event e at time t, as illustrated in FIG. 6.

Figure 7:
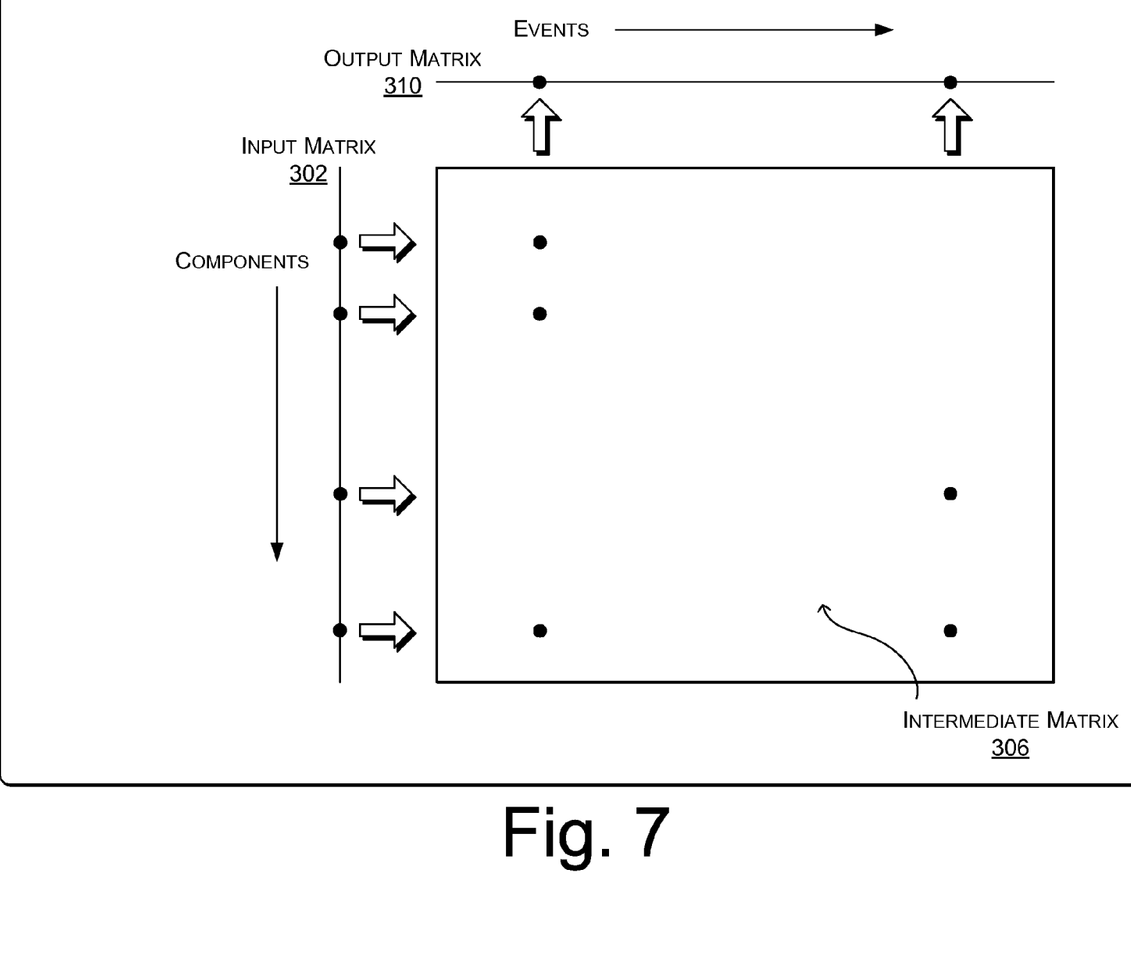
FIG. 7 is a diagram of an exemplary time slice of the matrices of FIG. 6.

FIG. 7 shows features of the exemplary discovery engine 108 in greater detail. One feature is the use of the intermediate matrix D 306 to compute the outputs O 310 from the input I 302. The discovery engine 108 exploits certain relationships between the three matrices to do so. FIG. 7 shows these relationships, apparent in a slice through the intermediate matrix D 306 (conceptually, a horizontal slice through the orthorhombic structure in FIG. 6).

In one implementation, the relationships that define and constrain the structure of the binary intermediate matrix D 306 are:

1) For any component c and time t, if I(c, t) equals 0 then D(c, e, t) equals 0 for all e.
2) For any component c, time t, and event e, if D(c, e, t) equals 1 then O(e, t) equals 1.

There are many values of the matrices D(c, e, t) and O(e, t) that satisfy these constraints for a given input matrix 302, I(c, t). To infer or hypothesize groups among the input data and common causes for the groups thus established, the failure/causes correlator 314 of the discovery engine 108 searches through the space of values to find the "best" intermediate and output matrices D 306 and O 310 for a given input matrix I 302. The "best" intermediate matrix 306 can be achieved by ranking candidate values that could be placed into each individual time slice of the intermediate matrix 306.

To enable such a search, the ranking engine 320 has the self-consistency evaluator 324 and the complexity evaluator 326 to guide the ranking of possible values D(c, e, t) and O(e, t). The self-consistency evaluator 324 analyzes the self-consistency of all three matrices A, D, and O as the likelihood of the values of D(c, e, t) and O(e, t) at each time t given the probabilities implied by the matrices over all times t. The intuitive principle at play in the self-consistency evaluator 324 is that if an event e is observed multiple times, it can be expected that the event will express itself each time with approximately the same set of observed failures. Thus, measuring self-consistency of the matrices is based on probability associations, events that the discovery engine 108 hypothesizes are occurring associated with which failure indicators are on.

The complexity evaluator 326 applies the principle of parsimony to forming the output O. The simplicity of an explanation O(e, t) for a set of failure observations I(c, t) is an important factor in ranking the quality of O(e, t) and D(c, e, t). The complexity evaluator 326 can achieve this complexity ranking in multiple ways, depending on the implementation. As explained below in greater detail, one implementation uses priors on the expected number of events and/or number of symptoms caused by each event. Alternatively, another implementation uses a cost function.

The exemplary discovery engine 108 performs the following operations:

First, matrices initializer 340 signals the input matrix manager 304, the intermediate matrix manager 308, and the output matrix manager 312 to initialize the input matrix 302, the intermediate matrix 306, and the output matrix 310 (i.e., I, D, and O respectively) to a valid, though not necessarily optimal, set of values.

Next, the iterative refiner 316 grooms the intermediate matrix D 306 and the output matrix O 310 until results satisfy the self-consistency evaluator 324 and the complexity evaluator 326 of the ranking engine 320, as described above. In one implementation, the iterative refiner 316 iteratively ranks candidate values that could be used in a "best" version of the intermediate matrix 306 until slices of the intermediate matrix 306 reach acceptable levels, or, an acceptable rate of change in the self-consistency metric and the parsimony metric is reached. In one embodiment, a sampling technique is applied that has a "burn in" period where it proceeds towards the region of most likely solutions, hardly ever stepping back, then once this region is reached, the sampling technique explores the region by moving around. The sampling technique may stop when a large enough time has passed or when the average consistency between the current solution and held out data stops changing. Other stopping criteria may be used, such as measuring the autocorrelation time of parts of the solution, or comparing several runs started from different initial solutions.

Once the intermediate matrix 306 and the output matrix 310 are "optimized" for the given input matrix 302, the discovery engine 108 extracts the desired output designated by the output selector 338 from output matrix O 310 and intermediate matrix D 306.

In one implementation, the matrices initializer 340 starts the output matrix O 310 by creating one event for each failure observed and setting O(e, t) equal to 1 for the time at which the observed failure occurred. The matrices initializer 340 initializes intermediate matrix D 306 by setting D(c, e, t) equal to 1 where e is the event created for the failure occurring at component c and time t.

Alternatively, the output matrix O may be initialized with a single event and O(e, t) set equal to 1 at all times when any failure is observed. In this case, the intermediate matrix D 306 is initialized by setting D(c, e, t) equal to 1 for all components c at time t when a failure is observed (there is only one event e in this case).

In one implementation, the iterative refiner 316 proceeds by iteratively erasing slices through the matrix space (intermediate matrix 306) and regenerating them with values consistent with (a) the probabilities implied by the remaining values in intermediate matrix D 306 and output matrix O 310; and (b) the values in the input matrix I 302 and the output matrix O 310; and (c) the constraints on D given earlier, namely that 1) for any component c and time t, if I(c, t) equals 0 then D(c, e, t) equals 0 for all e; and 2) for any component c, time t, and event e, if D(c, e, t) equals 1 then O(e, t) equals 1. This general process is well-known in the art as "sampling" and implementations may use Gibbs sampling, Metropolis-Hastings sampling, or other suitable sampling techniques.

In one implementation, the iterative refiner 316 implements each refining iteration in three substeps:

Update the output matrix O 310 based on the values in intermediate matrix D 306, setting or resetting the value O(e, t) based on the frequency with which e was active at other times. If a small probability result, then add a new event to the matrices O 310 and D 306.

Using the horizontal slice refiner 328 of the probability engine 322, recompute both the output matrix O 310 and the intermediate matrix D 306 along a horizontal slice: for each time t, erase the values of D(c, e, t). Compute new values as follows: for each event e, compute a vector $F_c$ of probabilities where $F_c=P(c|e)$, the probability that component c fails when event e is active. Using these vectors, compute new values of D(c, e, t) at time t. Remove any event that is not listed as the cause of any observed failure, i.e., if there exists some event e for which D(c, e, t) equals 0 for all values of component c and time t, remove that event e.

Using the vertical slice refiner 330 of the probability engine 322, recompute intermediate matrix D 306 along a vertical slice: for each component c, erase the values of D(c, e, t). Compute new values as follows: if I(c, t) equals 0, meaning that component c does not report a failure at time t, then D(c, e, t) for all events e for that component and time are unchanged. If I(c, t) equals 1 and O(e, t) equals 1, then D(c, e, t) must be set equal to 1 for at least one value of e for component c and time t—i.e., a new event e is generated if the probability of a new event is greater than the probability that the failure observation is explained by the existing events. If I(c, t) equals 1 and O(e, t) equals 0, then D(c, e, t) is set to 0.

As part of each iteration, the iterative refiner 314 recalculates values of output matrix O 310 to restore the constraint between output matrix O 310 and intermediate matrix D 306 that O(e, t) equals 1 if there is some component c, at time t, and event e for which D(c, e, t) equals 1.

In one implementation, the iterative refiner 316 uses a Beta Process to select when new events are to be generated so that the number of events does not need to be known a priori. The iterative refiner 316 does this by modeling both the "known failure events" 332 that have already been generated and used to explain failure symptoms and the "unknown failure events" 334 that potentially exist, but have not yet been used to explain the failure observations (have not been associated with a group of failure indications yet).

In one implementation, the iterative refiner 316 uses a Beta Process with base measure a product of Beta distribution, so that the atoms of the Beta Process represent the failure events as a product of multinomial distribution along with a weight representing the prevalence or frequency of the event.

In one implementation, the horizontal slice refiner 328 generates a proposal for the new values of D(c, e, t) for all c and e and fixed t by sampling from an approximation of the posterior distribution obtained by arranging the components in an arbitrary order and removing all backward dependencies in the graph representing the dependencies of the variables D(c, e, t) in the posterior. This approximation can be used directly or compensated for using the Metropolis-Hastings technique. Similarly the vertical slice refiner 330 samples new values of D(c, e, t) for all e and t and fixed c by dropping backward dependencies after arranging the time steps in an arbitrary order.

In a variation, the iterative refiner 316 pre-selects the number of events and computes the output matrix O 310 for different numbers of events, selecting the best output matrix O 310 as a final output, or can use another non-parametric model for generating events, In one implementation, the iterative refiner 316 uses Metropolis-Hastings sampling instead of Gibbs sampling to achieve faster convergence.

In still other alternative implementations, the iterative refiner 316 can refine the matrices D 306 and O 310 by recruiting other techniques. For example, simulated annealing can be used by itself as a model, or simulated annealing can be used in combination with the iterative sub-steps shown above, e.g., by defining a model temperature T that is gradually lowered as each iteration is completed. Then, the probability that a potential new configuration for output matrix O 310 and intermediate matrix D 306 is selected, is dependent on the temperature T.

After the iterative refiner 316 refines the output matrix 310 and the intermediate matrix 306 as described in the steps above, the output of the discovery engine 108 is extracted from the values of output matrix 310 and/or intermediate matrix 306. The output(s) selected by the output selector 338 can include the following:

- a listing of events representing distinct causes of observed failures. That is, the number of columns in output matrix O 310 can be output as the number of distinct causes for the observed failures;
- for each event and each component, a readout of the probability that the component fails when that event occurs. For each event e, a vector $F_c$ of probabilities is computed from the values in intermediate matrix D 306, where $F_c$ is equal to P(c|e), the probability that component c fails when event e is active. The set of computed vectors is compiled as the desired output;
- for each point in time, a list of events that are active (i.e., causing observable failures) at that point in time. For each time t, the desired output is a list of the events e that is created when O(e, t) is nonzero; and
- for each observed failure, a list of events that are most likely to be the cause of that observed failure. For each value of component c and time l for which I(c, t) equals 1, the desired output is a list of the events e for which D(c, e, t) is nonzero.

This output is typically given to network engineers, who may take the set of failure events and use out-of-band methods to investigate the actual true cause of problem. The output from the discovery engine 108 provides a powerful diagnostic tool. For example, once the engineer knows the set of autonomous systems 206 involved, and whether failures were detected in the data center of the content provider 202 or sent back from end-users, the engineer can employ other techniques—human contact, pings, trace routes, looking glasses, etc.—to determine the root cause of the problem, if the root cause is known to exist but is as yet unidentified.

Overlapping causes may occur when two root causes of failure happen during the same time slice, or when two or more root causes are independently responsible for the same set of failure indications. The discovery engine 108 uses one of several schemata to separate such multiple overlapping causes. In one implementation, output is directed from the output matrix 310 to filters and classifiers, such as an overlapping-causes filter 342 and a common-clause classifier 344. Yet, in another implementation, overlapping causes are sorted out during refinement by the matrices iterative refiner 316: the resolution of failure indications into groups automatically sorts out root causes that may overlap.

The common-clause classifier 344 categorizes the different types of root causes found or inferred, and a common-causes database 318 may be used to store classified causes and events into a database of known causes 332 and a database of unknown causes 334. Unknown causes may be determined to exist with high probability, yet still not be identified. The influence of an unknown cause may be clearly ascertained without knowing the nature of the unknown cause.

A trigger 336 may be included to start the exemplary discovery engine 108 or, similarly, to start an exemplary method that uses the logic embodied in the discovery engine 108. For example, a content provider 202 may expect to receive a certain number of requests from different autonomous systems 206 over time. The trigger 336 may track this request volume and detect anomalies: a low volume gets flagged as a component failure. Similarly, code might run on the computers of end-users to report back that the end-user cannot get to, e.g., a web site or web search engine at the particular point in time. All these are used as sensors for the trigger 336 and become the input observations for the input matrix 302 once the trigger initiates operation of the discovery engine 108. The trigger 336 may commence operation whenever a certain fraction of the sensors indicate a problem, or alternatively may commence operation periodically—once per day or hour. Then the discovery engine 108 takes a series of observations going back into the past, and produces a set of failure causes believed to exist in the data, and labels which sensors (at every point in time in which a sensor indicated a failure) are set in each root cause.

The results iterator 346 is optionally included so that output from a previous run of the discovery engine 108 can be used to provide a head start for a subsequent run of the discovery engine 108. Output is used in a next round of common-cause discovery to reduce calculation complexity and reduce time; and to chain results. The values for the intermediate matrix 306 can be persisted from a previous run to help "prime the pump" as the discovery engine 108 may take a certain amount of time to stabilize to a certain number of root causes that it infers may exist in the system. Thus, in one implementation, the matrices initiator 340 starts from scratch with default values, but in another implementation, each initialization begins with at least some of the accrued experience of previous runs.

Exemplar Methods

Figure 8:
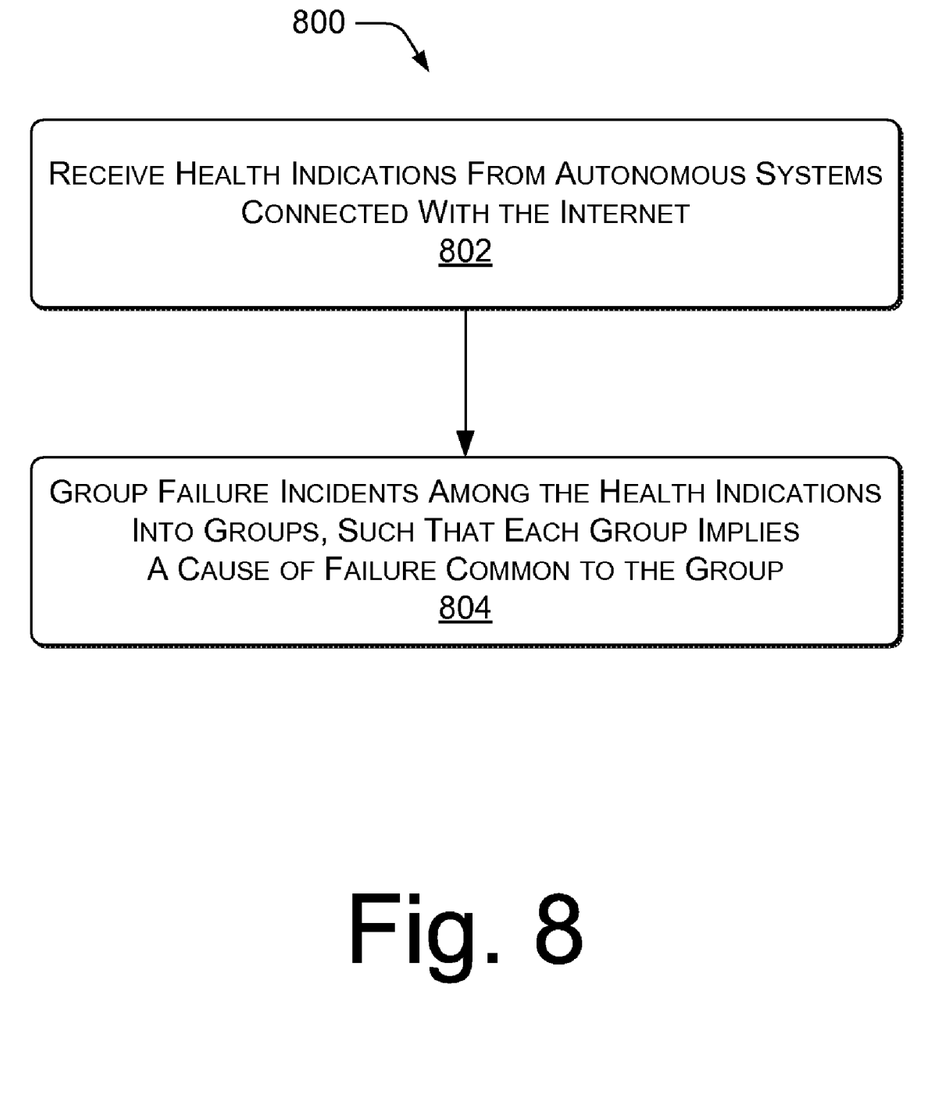
FIG. 8 is a flow diagram of an exemplary method of grouping failure indications to infer common causes.

FIG. 8 shows an exemplary method 800 of grouping failure indications to imply or infer common causes. In the flow diagram, the operations are summarized in individual blocks. The exemplary method 800 may be performed by hardware, software, or combinations of hardware, software, firmware, etc., for example, by components of the common-cause discovery engine 108.

At block 802, health indications are received from autonomous systems connected to the Internet. Over time, there may be hundreds or even thousands of health indications from numerous autonomous systems. During a significant failure event in a large network like the Internet, there are typically root causes responsible for the numerous merely symptomatic indications of individual connectivity failure. For a content provider, the failure of a large or even an obscure autonomous system—over which the content provider has no control—causes a domino effect of failed connectivity between content provider and end-user that usually signifies a significant loss of money.

At block 804, numerous failure indications are grouped, such that each group points to a common, often hidden, cause of the failure. This allows remedial action of the root cause instead of wasting resources on treating the many symptoms.

Figure 9:
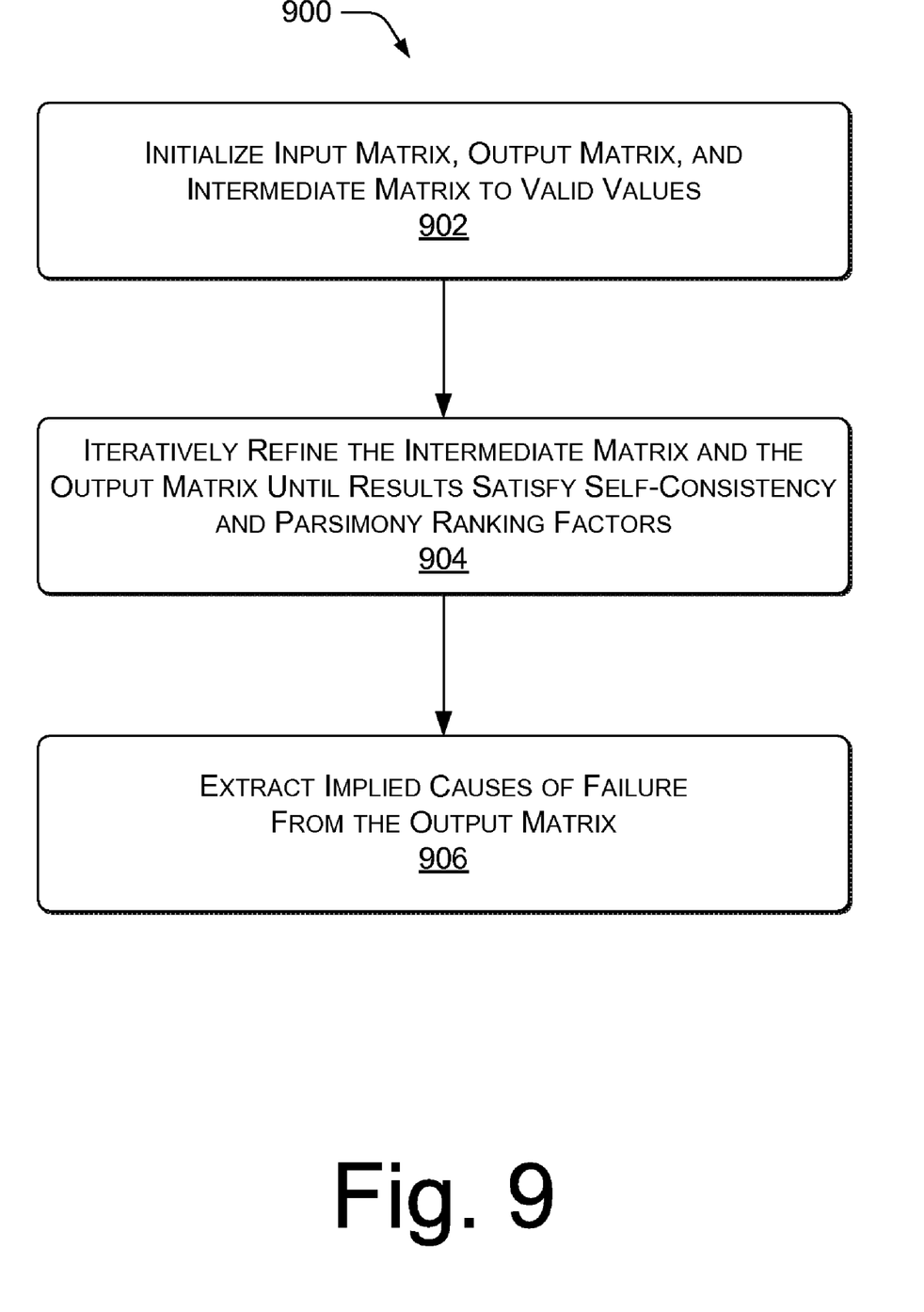
FIG. 9 is a flow diagram of an exemplary method of using a matrix system to group failure indications to infer common causes of failure for each group.

FIG. 9 shows an exemplary method 900 of using a matrix system to group together failure indications in order to imply common causes for each group. In the flow diagram, the operations are summarized in individual blocks. The exemplary method 900 may be performed by hardware, software, or combinations of hardware, software, firmware, etc., for example, by components of the common-cause discovery engine 108.

At block 902, a matrix system is initialized with valid, although not optimal values. The matrix system includes an input matrix of components versus time, showing failures (and health) of each component through time. The matrix system also includes an output matrix of implied common causes—of the failure indicators. Finally, the matrix system includes a 3-dimensional intermediate matrix, that has a matrix space correlating the input failure indications of the components with the implied causes of failure, via probability.

At block 904, the matrix system, i.e., the intermediate matrix and the output matrix, are iteratively refined until the values in the matrices satisfy self-consistency and parsimony constraints. With regard to self-consistency, the Internet system being monitored has components, each component typically causing approximately the same failure indications each time the component is in a failure state. The failure can be a drop in the number of client requests to the content provider, below a threshold. This consistency of cause and effect in the Internet system is also reflected in the self-consistency of the matrix system. With regard to parsimony, hypothesized groupings of the failure indications may be complex or simple, and the simple groupings are ranked highly in the exemplary method over complex groupings that infer the same cause of failure.

At block 906, the most likely groupings of the failure indications (e.g., as depicted in FIG. 5) and the most likely implied causes of failure (even though the causes may be unknown or hidden) are available as output from the output matrix. The output data may point with high probability to a root cause of failure for many of the failure indications received, and yet the actual root cause pointed to may be as yet unknown or undiscovered by the network engineers maintaining the content provider's system.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computer-executable method, comprising:

in a system of interrelated components, monitoring numerous components over time to detect a failure status of each of the numerous components with respect to intervals of the time;

for each interval of the time, receiving a failure indication for each component that is in failure during that interval;

forming one or more groups of the received failure indications, each group inferring a cause of failure common to the group;

arranging the received failure indications into a first matrix representing components versus time, the first matrix indicating the time intervals during which each component is in failure;

arranging the inferred causes of failure into a second matrix representing inferred causes of failure versus time;

correlating the components in the first matrix to the inferred causes of failure in the second matrix via a 3-dimensional intermediate matrix representing time slices, each time slice containing probability-based hypothetical groupings of the failure indications received at the time of the time slice and corresponding inferred causes of failure; and ranking candidate values for each time slice to distinguish more probable hypothetical groupings of the failure indications from less probable hypothesized groupings of the failure indications.

2. The computer-executable method as recited in claim 1, wherein the identity of the inferred cause of failure is unknown.

3. The computer-executable method as recited in claim 1, further comprising:

compiling a record of the inferred causes of failure associated with the groups;

prioritizing the inferred causes of failure based on the groups; and weighing whether to invest a resource in fixing a particular inferred cause of failure based on the prioritizing.

4. The computer-executable method as recited in claim 1, wherein the candidate values for time slices are ranked according to a self-consistency metric and a parsimony metric, the highest ranked time slice providing the most likely hypothetical groupings of the failure indications and the most likely corresponding inferred causes of failure, for a given set of failure indications received as input at a particular time.

5. The computer-executable method as recited in claim 4, wherein the self-consistency metric analyzes each time slice against an expectation that each inferred cause of failure expresses itself in the first, second, and intermediate matrices with approximately the same set of failure indications each time the inferred cause of failure occurs, wherein each time slice is ranked in relation to how closely the time slice matches the self-consistency of the matrices.

6. The computer-executable method as recited in claim 4, wherein the parsimony metric analyzes each time slice against an expectation that a less complex hypothetical grouping of failure indications is more probable than a more complex hypothetical grouping of failure indications for inferring the same cause of failure.

7. The computer-executable method as recited in claim 6, wherein the parsimony metric uses priors on a number of the inferred causes of failure or uses a cost function to obtain a complexity ranking.

8. The computer-executable method as recited in claim 6, wherein the parsimony metric prefers a hypothetical grouping of failure indications with additional groups when probabilities drawn from a random process such as a Beta Process indicate the additional groups are more likely than hypothetical groupings that do not use the additional groups.

9. The computer-executable method as recited in claim 4, wherein the intermediate matrix comprises a binary matrix, and for a given component at a given time, if the component is not in failure then a correspondence to an inferred cause of failure is a value of zero in the intermediate matrix and wherein if the component is in failure then a correspondence to an inferred cause of failure is a value of one in the intermediate matrix, 10. The computer-executable method as recited in claim 4, further comprising iteratively refining the intermediate matrix and the second matrix until the time slices of the intermediate matrix reach acceptable levels or an acceptable rate of change in the self-consistency metric and the parsimony metric.

11. The computer-executable method as recited in claim 10, wherein iteratively refining the intermediate matrix and the second matrix includes iteratively erasing horizontal time slices of a 3-dimensional intermediate matrix space and regenerating the slices consistent with remaining values in the intermediate matrix, including:

computing a vector of probabilities for each inferred cause of failure, the vector comprising the probability that a component fails when the inferred cause of failure is active;

computing new values for the intermediate matrix for a given time based on the vector;

removing inferred causes of failure that are not associated with an indication of failure; and updating the second matrix based on changes in the intermediate matrix.

12. The computer-executable method as recited in claim 11, further comprising recomputing vertical slices of the intermediate matrix, including:

erasing a slice of the intermediate matrix corresponding to a component;

if the component is not in failure at a given time, then leaving associations between the component and inferred causes of failure unchanged in the intermediate matrix;

if the component is in failure at a given time, and there is an inferred cause of failure in the second matrix for that time, then setting at least one association in the intermediate matrix between the component and the inferred cause of failure equal to a value of one; and generating a new inferred cause of failure according to a Beta Process if a probability of a new inferred cause of failure is greater than a probability that a failure indication is caused by existing inferred causes of failure.

13. The computer-executable method as recited in claim 1, wherein the system of interrelated components comprises the Internet, and the interrelated components comprise autonomous systems communicatively coupled with the Internet.

14. The computer-executable method as recited in claim 1, wherein the computer-executable method outputs one of:

a set of inferred causes of failure representing distinct causes of the failure indications;

for each inferred cause of failure and each component, the probability that the component fails when the inferred cause of failure occurs;

for each point in time, a list of inferred causes of failure that are currently causing failure indications at that point in time; and for each failure indication, a list of inferred causes of failure that are most likely to be the cause.

15. A system, comprising:

an input matrix to arrange failure indications received from sensors monitoring a network with respect to time;

an output matrix to arrange inferred causes of failure to be associated with the failure indications with respect to time; and a 3-dimensional intermediate matrix to associate the failure indications with the inferred causes of failure, the 3-dimensional intermediate matrix representing time slices, each time slice containing probability-based hypothetical groupings of the failure indications received at the time of the time slice and corresponding inferred causes of failure.

16. The system as recited in claim 15, further comprising:

an iterator to refine the intermediate matrix and the output matrix based on refining slices of the intermediate matrix according to:

self-consistency of the input, output, and intermediate matrices; and parsimony of the associations between the failure indications and the inferred causes of failure, wherein a less complex hypothetical grouping of failure indications has a higher probability than a more complex hypothetical grouping of the failure indications of being caused by a same cause of failure.

17. The system as recited in claim 15, further comprising a database of inferred known causes and inferred unknown causes.

18. The system as recited in claim 15, further comprising a result iterator, to persist correlations between groups of failure indications and the inferred causes of failure between runtimes of the system.

19. A system, comprising:
- a first component for receiving numerous health indications from each of numerous components connected with the Internet; and
- a second component for grouping failure incidents among the health indications into groups, such that each group implies a cause of failure common to the group;
- a third component for arranging the received failure indications into a first matrix representing components versus time, the first matrix indicating the time intervals during which each component is in failure;
- a fourth component for arranging the inferred causes of failure into a second matrix representing inferred causes of failure versus time;
- a fifth component for correlating the components in the first matrix to the interred causes of failure in the second matrix via a 3-dimensional intermediate matrix representing time slices, each time slice containing probability-based hypothetical groupings of the failure indications received at the time of the time slice and corresponding inferred causes of failure; and
- a sixth component for ranking candidate values for each time slice to distinguish more probable hypothetical groupings of the failure indications from less probable hypothesized groupings of the failure indications.

* * * * *